April 27, 1948. A. H. BAHNSON, JR 2,440,627

AIR CONDITIONING APPARATUS

Filed Aug. 23, 1945 3 Sheets-Sheet 1

Inventor:
Agnew H. Bahnson Jr
By Pierce & Scheffler
his Attorneys.

April 27, 1948.  A. H. BAHNSON, JR  2,440,627
AIR CONDITIONING APPARATUS
Filed Aug. 23, 1945  3 Sheets-Sheet 3
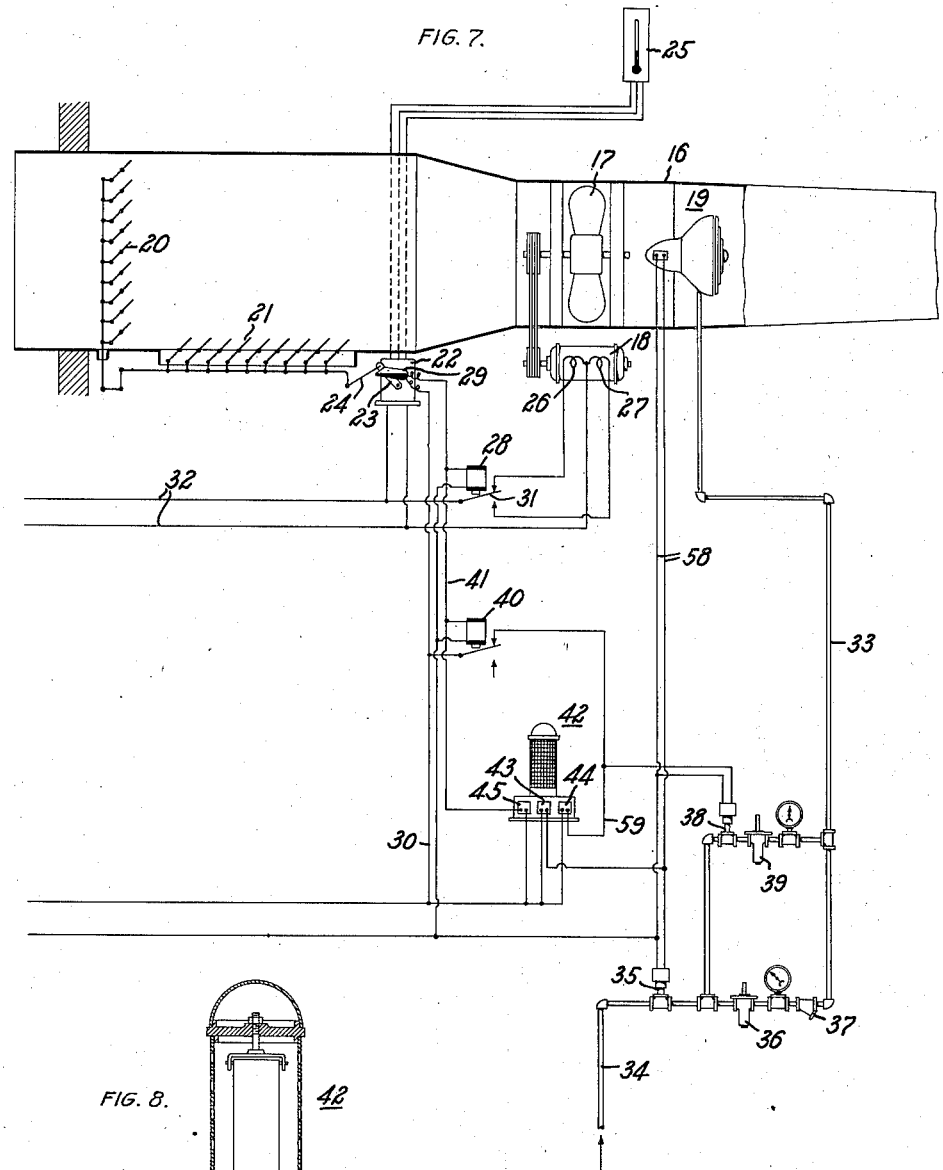
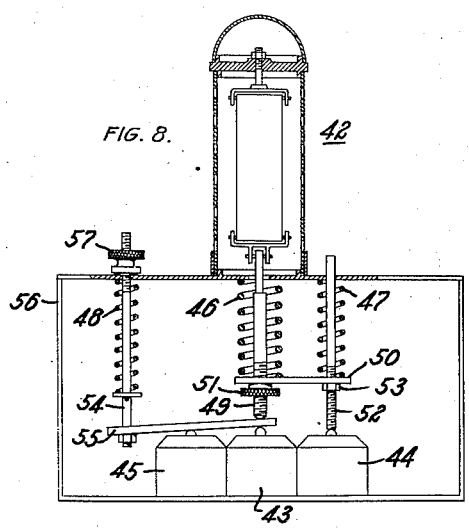
Inventor:
Agnew H. Bahnson Jr.
By Pierce & Scheffler
his Attorneys.

Patented Apr. 27, 1948

2,440,627

UNITED STATES PATENT OFFICE 2,440,627

AIR CONDITIONING APPARATUS

Agnew H. Bahnson, Jr., Winston-Salem, N. C.

Application August 23, 1945, Serial No. 612,179

6 Claims. (Cl. 236—44)

This invention relates to air conditioning apparatus and more particularly to a duct system for creating a current of conditioned air to be delivered into an enclosed space or room.

An object of the invention is to provide a duct system wherein water is introduced into a current of air in an atomized condition for evaporation therein to create the desired humidity in the space to which the air current is delivered, and wherein entrained mist or droplets are prevented from reaching the space or room.

Further objects are to provide for optional capacity addition of moisture to the air and for control of the volume of air delivered to the space from out of doors and/or recirculated from the space in accordance with conditions existing within the space. Another object is to control the rates and amounts of water introduced into the stream of air in accordance with conditions within the space.

Still further objects are to provide an efficient air conditioning apparatus for conditioning a space where generally high humidity is desired and where operations tend to lower the humidity below desired values.

The apparatus according to the invention comprises the combination of an air treating duct for taking air from a source of supply such as the out of doors and/or from the space to be conditioned and delivering it into said space, the duct being provided with any suitable inlet such as one controlled by louvres or dampers or both and with suitable outlets such as a plurality of suitably shaped and directed openings or nozzles, a fan or blower having a driving motor positioned preferably outside of the duct and adapted to operate the fan at any desired speed, mechanism such as a grid of vanes on the downstream side of said fan for eliminating or reducing the rotary component of motion of the stream of air created by the fan, an atomizer positioned in the duct and, if desired, a spray eliminator in said duct on the downstream side of the atomizer.

In one embodiment, the mechanism for introducing atomized water into the stream of air comprises at least one pair of rotating disc and abutment ring type atomizers having a motor for driving the pair, the atomizing unit being positioned in the duct with the axis of the rotating discs perpendicular to the direction of flow of the air stream.

The apparatus according to the invention also comprises a duct having an inlet for air to be humidified and an outlet for discharging air to a space to be humidified, air circulating mechanism including a fan mounted in the duct and a motor for driving the fan, a humidifying unit mounted in the duct, a temperature control for lowering the speed of the fan and the rate of water delivery from the air humidifying unit in response to lower temperatures in the space to be humidified, a humidity control responsive to initial decreases in space humidity for increasing the rate of water delivery from the air humidifying unit above that which would obtain in response to space temperature, and a second humidity control responsive to further decreases in space humidity for increasing the speed of the fan above that at which it would operate in response to space temperature. Of course, desirable sub-combinations of the several controls hereinbefore set forth also are within the purview of the invention.

The invention will be more particularly set forth, and other objects, aims and advantages will be in part apparent and in part pointed out, in the following detailed description taken in conjunction with the accompanying drawings, wherein:

Fig. 7 is partially diagrammatic side elevational view of another modification of the apparatus including control elements of the system; and Fig. 8 is an elevation of a humidostat employed in the apparatus.

Figure 1:
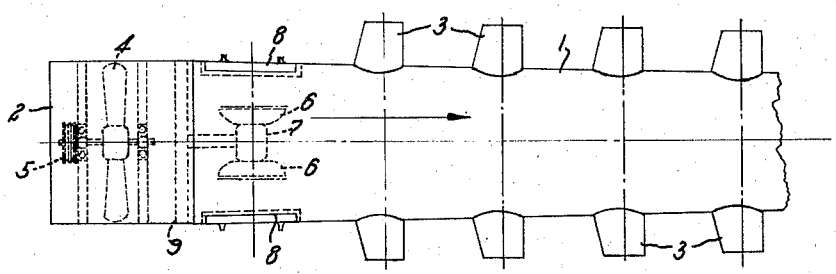
Fig. 1 is a top plan view of one form of the apparatus.

Certain parts of the apparatus are shown in the drawings only diagrammatically since they are individually old and shown in detail elsewhere, for instance in my Patents 2,350,997 and 2,262,542 and Patent 2,261,103 to Frederic F. Bahnson.

Figure 2:
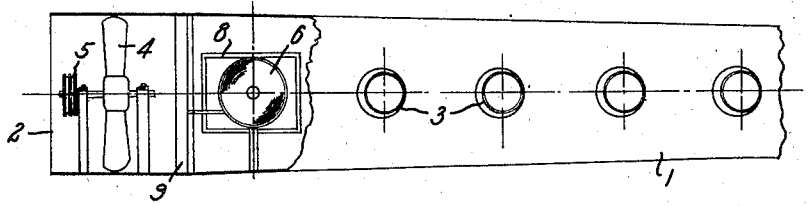
Fig. 2 is a side elevational view of the apparatus shown in Fig. 1, parts being broken away.

Referring to Figs. 1 and 2 of the drawings, the reference numerical 1 identifies a duct having an air inlet 2, a series of outlets 3 for the stream of air that is established by a fan 4 that is driven by a motor, not shown, the motor being located outside the duct and belt-connected to the pulley 5 on the fan shaft. A pair of rotating disc atomizers 6 are mounted on the ends of the shaft of a motor 7, the axis of the discs and motor being perpendicular to the air stream through the duct. Doors 8 at opposite sides of the duct provide access for inspection or repair of the atomizers. A grid 9 of air straightening vanes is located between the fan 4 and the atomizers 6, to eliminate the rotary component of the air stream.

Figure 3:
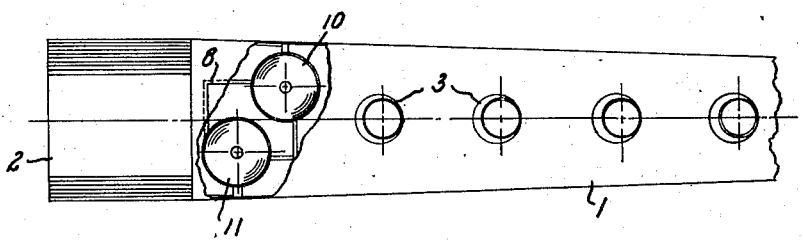
Fig. 3 is a view similar to Fig. 2 showing a modified form of the apparatus including two pairs of atomizers.

A larger evaporative capacity may be provided by arranging two sets of dual-disc atomizers 10, 11 in the duct 1, as shown in Fig. 3. This multiplication of the water atomizing units may of course be extended in accordance with the size of the duct or volume of air to be humidified, and the expected demand for water to maintain the desired humidity. The plurality of humidifier units may be located side by side if space permits, or staggered as illustrated.

Figure 4:
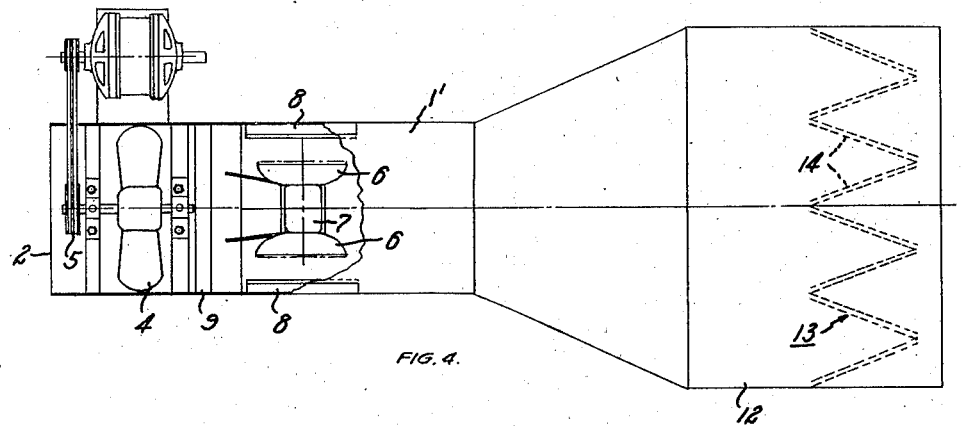
Fig. 4 is a top plan view of another modification of the apparatus including a spray eliminator.
Figure 5:
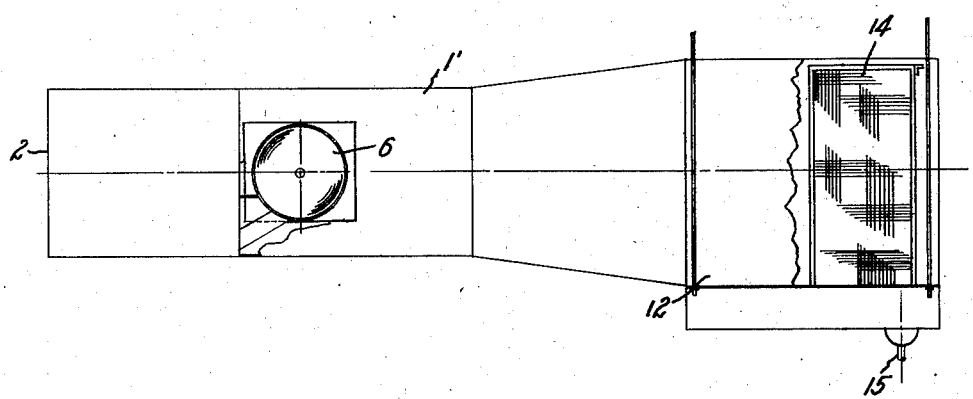
Fig. 5 is a side elevational view of the apparatus of Fig. 4.
Figure 6:
Fig. 6 is an enlarged cross-sectional view of one of the eliminator panels.

In the modification illustrated in Figs. 4 and 5, the duct 1' is flared at the outlet end 12 to reduce the velocity of the air and to provide space for the spray eliminator 13 which may be of any known construction or preferably, as illustrated, may be a series of panels 14 standing vertically in the duct but at an oblique angle to the axis thereof. This arrangement of the filter panels provides a greater filter area than would be provided if the panels were perpendicular to the axis of the duct. Moreover by positioning the panels at an oblique angle to the direction of flow of the air stream a better filtering or spray eliminating action is produced. As best shown in Fig. 6, the panels each consist of a rectangular frame supporting a plurality of layers of fine mesh wire screen, for example 16 mesh per inch screen, backed up on the outlet side by a single layer of coarse, for example half inch, wire screen. The panels are supported on or above a drip pan and the entrained water particles caught by the layers of wire screen flow downward, particularly on the wires of the coarse wire screen, and collect in the pan from which this excess water is discharged through the pipe 15.

Referring now to Figs. 7 and 8, showing the control system and auxiliary equipment in accordance with the invention, the duct 16 is provided with an internal fan 17 that is belt-driven by an electric motor 18 mounted outside the duct. An atomizer unit 19 including an electric driving motor in its housing is mounted in the duct on the downstream side of the fan. As in the modification hereinbefore described, the air conditioning apparatus may have a spray eliminator at or near the outlet and it may also have air straightening means positioned between the fan and the atomizer.

As shown, the duct inlet for outdoor air is provided with adjustable louvres 20 and a complementary set of adjustable louvres 21 is provided at the recirculating air inlet to the duct.

The louvres are operated by a modulating or step motor 22 through a crank 23 and connecting link 24. When arm 23 is vertical, the outside louvres 20 are fully open and the inside louvres 21 are fully closed, and when the crank arm 23 is extended to the left horizontally, the outside louvres are fully closed and the recirculating louvres are fully open. As shown in Fig. 7, the crank arm is at about 45° to the horizontal which corresponds approximately to the half open position of both sets of louvres.

The motor 22 operates the louvres in response to temperature changes in the conditioned space as sensed by thermostat 25 located in the space. As the temperature in the conditioned space drops, less outside air and more recirculated air is admitted to the duct 16, and vice versa, the general condition being that the outside air is cooler than that in the conditioned space.

Also, I have found it advantageous to provide a variable speed fan that can be operated at high speed when much outside air is needed, in accordance with temperature requirements, and at a lower speed when little or no outside air is called for. But, since the outside air generally is drier than required in the conditioned space, I have found it beneficial to increase the rate of addition of water to the stream of air being conditioned when the fan is running at high speed and when relatively large amounts of outside air are being drawn in for cooling the room space.

The motor 18 which drives the fan is a conventional two-speed electric motor having high speed windings 26 and low speed windings 27. A relay 28 is employed for shifting the motor between high and low speeds in accordance with temperature in the conditioned space as will more fully appear.

A mercury switch 29 is mounted on the crank arm 23 of the louvre actuating motor 22 at an angle such that make and break will occur at about the midpoint of louvre opening. Inspection of the drawing will show that the mercury switch closes when the arm 23 is above the 45° position shown, i. e. when the temperature is relatively high in the conditioned space and much outside air is needed for cooling. The switch opens when the arm 23 is below that position, i. e. when the temperature in the conditioned space is relatively low and little outside air is wanted.

The mercury switch 29 is connected in series with the relay 28 across the control line 30 that may be at substantially less than the power circuit voltage. When the solenoid is energied, the armature or switch arm 31 connects the high speed winding 26 of the fan motor to the power circuit 32 and the fan runs at high speed, a condition desired when the temperature in the conditioned space is high. Conversely, when the temperature in the conditioned space is low, the mercury switch 29 breaks the circuit to deenergize the relay 28, allowing arm 31 to drop, thus throwing the motor on low speed.

It will be understood, of course, that a thermostat located in the conditioned space may be utilized directly to shift or modulate the fan motor speed, instead of shifting the fan motor speed indirectly in response to temperature changes through the mercury switch 29.

Under ordinary operating conditions, it is desirable that the rate of addition of moisture to the stream of air passing through the duct be coordinated with fan speed, so that when the fan is running at low speed less moisture is introduced than when the fan is running at high speed. The atomizer 19 is supplied with water through a pipe 33 from a source (not shown) of water under elevated pressure of say 50 pounds per square inch. Water from the source is led in through pipe 34 and valve 35, which valve for the present will be assumed to be open. The incoming water may take one of two possible paths. The first is through a pressure reducing valve 36, which reduces the water pressure to, for example, 20 pounds per square inch. Water then flows through check valve 37 to pipe 33 and is delivered to the atomizer 19 at a pressure of approximately 20 pounds per square inch. Water will follow the above described path when the solenoid valve 38 of the alternative water flow path is closed.

When the solenoid valve 38 is open, water at high pressure passes to the reducing valve 39, which reduces the water pressure to, say, 25 pounds per square inch, to pipe 33 and finally to the atomizer 19.

The solenoid valve 38 for supplying water at high pressure to the atomizer 19 is controlled by a relay 40 that is connected in parallel with the motor-speed relay 28 by a jumper 41. The mercury switch 29 thus energizes relays 28 and 40, when the switch 29 is closed in response to a rise in temperature within the room, to increase the fan speed and simultaneously to increase the rate of water flow to the humidifier 19.

The main valve 35 in the water supply line is also of the solenoid or motor-operated type, and is controlled automatically by a humidostat 42 and a switch 43 that is connected, in series with the solenoid of valve 35, across the control line 30. The humidostat 42 may be and preferably is of the type described in the patent to Frederic F. Bahnson, No. 2,261,750, and switch 43 may be of any of the known midget switches of the snap-action type. The humidity control system differs from that described in the prior patent in that two additional switches 44, 45 are controlled by the humidostat, see Fig. 8, all of the switches being automatically closed in sequence, in the order switches 43, 44 and 45, when the relative humidity falls progressively below the desired value, and being opened in the reverse order when the relative humidity increases to and above the desired value. The switches close automatically when their small operating plungers are relieved from the pressure of their respective opening springs 46, 47 and 48 as the humidostat shortens with decreasing relative humidity, and the sequence operation at preselected relative humidities is obtained through the adjustable linkages that are moved towards switch-opening positions by the respective springs if and as permitted by the humidostat 42. As shown in Fig. 8, the opening spring 46 of the switch 43 is coiled around the main operating rod 49 that is suspended from the hygroscopic element of the humidostat 42. The spring 46 seats at its lower end on a bar 50 that is adjustable axially of the threaded rod 49 by a nut 51, and the operating rod 52 of the switch 47 is slidable through the other end of the bar 50. Coil spring 47 surrounds the rod 52 and bears against the bar 50, but spring 47 is lighter than the spring 46 and can displace the outer end of the bar 50 downwardly only to the extent permitted by the movement of the main operating rod 49 of the humidostat. The rod 52 has a shoulder 53 below the bar 50 and engaged thereby to depress the rod 52 and open the switch 44 when the relative humidity falls below the desired value by an amount that is determined by the adjustment of the nut 51 along the main control rod 49.

The switch 45 is opened by the humidostat 42 at a still lower relative humidity value or, conversely, is closed by the spring 48 at a relative humidity well below the desired value through an operating rod 54 and lever 55. One end of the lever 55 is interposed between the main operating rod 50 and the plunger of switch 43, and the opposite end or floating fulcrum is adjustably suspended from the frame 56 by the rod 54 and the nut 57 that is threaded upon the rod.

The control linkages are so adjusted that a progressive decrease in relative humidity below the desired value results in the closing in sequence of the switches 43, 44 and 45. The closing of the switch 43 results, as described above, in the opening of the valve 35 in the water supply system, thereby delivering water at a pressure of say 20 pounds per square inch to the humidifier 19. The motor of the humidifier 19 is simultaneously energized through leads 58 in parallel with the solenoid of the water valve 35.

The switch 44 is connected through a lead 59 to the control circuit of the solenoid-operated valve 38 in the high pressure supply line to the humidifier 19. The switch 44 closes when the relative humidity in the space or room drops somewhat below the desired value, thereby delivering water at a higher rate to the humidifier 19 to expedite the restoration of the relative humidity to the desired value.

The switch 45 closes when the relative humidity drops still further below the desired value to complete an energizing circuit to the motor speed relay 28 through a lead 60 and the jumper 41. The rate of water evaporation is thereby increased by the resulting higher speed of the air current in duct 16 within which a mist of fine water particles is established by the rotating disc humidifier 19. This control of the fan speed in response to a major demand for increased humidification is thus superior to the control of fan speed in response to temperature conditions within the space to be conditioned.

The invention has been described with respect to a humidifying system in which the quantities of circulated air and of introduced water are controlled step-by-step but it is to be understood that the fan speed or the water supply, or both, may be continuously modulated to obtain the desired relative adjustments of the rates of air circulation and of water supply. In its broader aspects, the invention is not limited to the illustrated rotary disc type of humidifier as spray nozzles may of course be substituted for the rotating disc type of atomizer.

I claim:

1. Air conditioning apparatus which comprises: a duct having an inlet for air to be humidified and an outlet for discharging humidified air to a space to be humidified; air circulating means including a fan mounted in the duct and a motor for driving said fan; air humidifying means mounted in said duct; means controlled by the temperature within the space to be humidified for varying the speed of the fan and the rate of water supply to said humidifying means; and hydroscopic means responsive to a drop in the humidity substantially below the desired value for increasing the rate of water supply to said humidifying means above the rate established by said temperature-controlled means for a relatively low fan speed.

2. Air conditioning apparatus which comprises: a duct having an inlet for air to be humidified and an outlet for discharging humidified air to a space to be humidified; air circulating means including a fan mounted in the duct and a motor for driving said fan; air humidifying means mounted in said duct; temperature-controlled means for lowering and raising the speed of said fan in response to lower and higher temperatures respectively in the space to be humidified; and means responsive to a decrease in space humidity for increasing the speed of said fan above that established by said temperature-controlled means for a relatively low temperature within the space to be humidified.

3. Air conditioning apparatus which comprises: a duct having an inlet for air to be humidified and an outlet for discharging air to a space to be humidified; air circulating means including a fan mounted in the duct and a motor for driving said fan, air humidifying means mounted in said duct; temperature-controlled means for lowering the speed of said fan and the rate of water delivery from said air humidifying means and for raising these rates in response to lower and higher temperature respectively in the space to be humidified; and means responsive to decreases in space humidity for increasing the speed of said fan and the rate of water delivery from said humidifying means to values above those established by said temperature-controlled means for a relatively low temperature within the space to be humidified.

4. Air conditioning apparatus which comprises: a duct having an inlet for air to be humidified and an outlet for discharging air to a space to be humidified; air circulating means including a fan mounted in said duct and a two-speed motor for driving said fan; air humidifying means including a rotating disc and abutment ring type atomizer mounted in said duct and means supplying water under pressure to said atomizer; means for varying the pressure of water supplied to the atomizer; a thermostat positioned in the space to be humidified, means controlled by said thermostat constructed and arranged to operate said fan motor at low speed and said water pressure varying means at low pressure in response to low temperature in the space to be humidified; a humidostat in said space and means controlled by said humidostat to override said thermostat-controlled means to operate said fan at high speed and said water pressure varying means at high pressure in response to low humidity in said space.

5. Air conditioning apparatus which comprises: a duct having an inlet for air to be humidified and an outlet for discharging air to a space to be humidified; air circulating means including a fan mounted in the duct and a motor for driving the fan; air humidifying means mounted in the duct; thermostatic means for lowering the speed of said fan and the rate of water delivery from said air humidifying means and for raising these rates in response to lower and higher temperatures in the space to be humidified; means responsive to initial decreases in space humidity for increasing the rate of water delivery from said air humidifying means above that which would obtain in response to control by said thermostatic means at a low space temperature; and means responsive to further decreases in space humidity for increasing the speed of the fan above that at which it would operate in response to control by said thermostatic means at a low space temperature.

6. Air conditioning apparatus which comprises: a duct having an inlet for air to be humidified and an outlet for discharging air to a space to be humidified; air circulating means including a fan mounted in said duct and a two-speed motor for driving said fan; air humidifying means including a rotating disc and abutment ring type atomizer mounted in said duct and means supplying water under pressure to said atomizer; means for varying the pressure of water supplied to the atomizer from a low pressure to a high pressure; valve means for interrupting flow of water to said atomizer; a thermostat positioned in the space to be humidified, means controlled by said thermostat to operate said fan motor at low speed and said water pressure varying means at low pressure in response to low temperature in the space to be humidified and to operate said fan motor and said pressure varying means at high values in response to high temperature in said space; a humidostat in said space, means controlled by said humidostat to close said valve means to interrupt the flow of water to said atomizer when the humidity is at a desired value in said space and to open said valve means to allow water to flow to said atomizer when the humidity drops below the desired value, and additional means controlled by said humidostat upon progressively greater drops in humidity to adjust said water pressure varying means to high pressure and to operate said fan motor at high speed.

AGNEW H. BAHNSON, Jr.

REFERENCES CITED

The following references are of record in the file of this patent:

UNITED STATES PATENTS

| Number | Name | Date |
|---|---|---|
| 1,745,239 | Bahnson | Jan. 28, 1930 |
| 2,022,740 | Rowell | Dec. 3, 1935 |
| 2,038,579 | Lamb | Apr. 28, 1936 |
| 2,262,542 | Bahnson, Jr. | Nov. 11, 1941 |
| 2,350,997 | Bahnson, Jr. | June 13, 1944 |
| 2,358,847 | Bahnson, Jr. | Sept. 26, 1944 |

FOREIGN PATENTS

| Number | Country | Date |
|---|---|---|
| 282,233 | Great Britain | Dec. 22, 1927 |